(12) United States Patent
Nose et al.

(10) Patent No.: US 12,337,816 B2
(45) Date of Patent: Jun. 24, 2025

(54) CONTROLLER FOR VEHICLE, CONTROL METHOD FOR VEHICLE, AND MEMORY MEDIUM

(71) Applicant: TOYOTA JIDOSHA KABUSHIKI KAISHA, Toyota (JP)

(72) Inventors: Yuki Nose, Nagoya (JP); Yuto Ikeda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 18/165,367

(22) Filed: Feb. 7, 2023

(65) Prior Publication Data

US 2023/0303057 A1   Sep. 28, 2023

(30) Foreign Application Priority Data

Mar. 22, 2022   (JP) .................................. 2022-045477

(51) Int. Cl.

| | |
|---|---|
| *F01N 3/22* | (2006.01) |
| *B60W 10/06* | (2006.01) |
| *B60W 10/08* | (2006.01) |
| *B60W 20/10* | (2016.01) |
| *F01N 3/023* | (2006.01) |

(Continued)

(52) U.S. Cl.
CPC ............ *B60W 20/10* (2013.01); *B60W 10/06* (2013.01); *B60W 10/08* (2013.01); *F01N 3/023* (2013.01); *F02D 41/0087* (2013.01); *F02D 41/029* (2013.01); *B60W 2710/0616* (2013.01);

(Continued)

(58) Field of Classification Search
CPC . F01N 3/22; F01N 3/2006; F01N 3/32; F01N 3/023; B60W 20/10; B60W 10/06; B60W 10/08; B60W 2710/0616; B60W 2710/0622; B60W 2710/08; F02D 41/0087; F02D 41/029
See application file for complete search history.

(56) References Cited

U.S. PATENT DOCUMENTS 4,993,452 A * 2/1991 Hough .................. F16K 15/147
                                                    137/515.7
8,818,691 B2   8/2014 Douglas et al.
(Continued)

FOREIGN PATENT DOCUMENTS

| | | |
|---|---|---|
| JP | 2010-13974 A | 1/2010 |
| JP | 2021-60027 A | 4/2021 |

*Primary Examiner* — Gonzalo Laguarda
(74) *Attorney, Agent, or Firm* — Oblon, McClelland, Maier & Neustadt, L.L.P.

(57) ABSTRACT

A controller for a vehicle is provided. An air supply passage is connected to a portion upstream of a filter in an exhaust passage. An air supplying process supplies air to the filter through an air supply passage by driving an air pump. An oxygen supplying process supplies oxygen to the filter through the exhaust passage, the oxygen having been passed through a combustion chamber of an internal combustion engine. A reducing process sets an air supply amount per unit time in the air supplying process obtained when the oxygen supplying process and the air supplying process are simultaneously executed to be lower than the air supply amount per unit time in the air supplying process obtained when the oxygen supplying process and the air supplying process are not simultaneously executed.

20 Claims, 5 Drawing Sheets

(51) Int. Cl.
  *F02D 41/00*          (2006.01)
  *F02D 41/02*          (2006.01)
(52) U.S. Cl.
  CPC . *B60W 2710/0622* (2013.01); *B60W 2710/08* (2013.01); *F01N 3/22* (2013.01)

(56) References Cited

U.S. PATENT DOCUMENTS

| | | | |
|---|---|---|---|
| 9,593,616 B2 | 3/2017 | Amano | |
| 10,502,151 B2 * | 12/2019 | Kelly | F02B 37/10 |
| 11,428,179 B1 * | 8/2022 | Kurtz | F02D 13/04 |
| 2021/0107452 A1 | 4/2021 | Nose et al. | |

* cited by examiner

CONTROLLER FOR VEHICLE, CONTROL METHOD FOR VEHICLE, AND MEMORY MEDIUM

BACKGROUND

1. Field

The present disclosure relates to a controller for a vehicle, a control method for a vehicle, and a memory medium for controlling a vehicle equipped with an internal combustion engine.

2. Description of Related Art

Japanese Laid-Open Patent Publication No 2010-013974 discloses an internal combustion engine equipped with an air supply device that draws air into an exhaust passage. The air supply device includes an air pump and an air supply passage that is connected to the exhaust passage. The internal combustion engine disclosed in the literature drives the air pump to deliver air to the exhaust passage through the air supply passage. The air supply device supplies the air to a filter in the exhaust passage to expedite combustion of deposited particulate matter.

Japanese Laid-Open Patent Publication No. 2021-060027 discloses a vehicle equipped with an internal combustion engine that includes cylinders. The vehicle includes an exhaust purifying device that purifies exhaust gas discharged out of the cylinders. The vehicle disclosed in the literature includes a controller that executes a deactivating process. The deactivating process stops the supply of fuel to a deactivated cylinder and supplies fuel to the remaining cylinders. The deactivated cylinder refers to one or more of the cylinders of the internal combustion engine.

Thus, executing the deactivating process supplies oxygen to the exhaust purifying device through the deactivated cylinder, in which the supply of fuel is stopped. Since oxidization is expedited in the catalyst, combustion of the particulate matter deposited in the filter is expedited.

The combustion of the particulate matter deposited in the filter can be expedited also by an oxygen supplying process. In the oxygen supplying process, the oxygen that has passed through a combustion chamber of the internal combustion engine is supplied to the exhaust passage as in the deactivating process.

When oxygen is supplied to the filter, the combustion of particulate matter is expedited so that regeneration of the filter is completed quickly. However, if an excessive amount of oxygen is supplied, the filter will be overheated. Thus, it is desired that the regenerating process of the filter is completed quickly while also limiting the overheating of the filter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for a vehicle. The controller includes control circuitry. The vehicle for which the controller is employed is equipped with an internal combustion engine. The control circuitry is configured to execute: an air supplying process that supplies air to a filter in an exhaust passage by driving an air pump of an air supply device, the internal combustion engine including the air supply device, the air supply device including the air pump and an air supply passage connected to a portion upstream of the filter in the exhaust passage, and the air supplying process drawing air into the exhaust passage through the air supply passage by driving the air pump so that the air drawn into the exhaust passage is supplied to the filter; an oxygen supplying process that supplies oxygen to the filter through the exhaust passage, the oxygen having been passed through a combustion chamber of the internal combustion engine; and a reducing process related to an air supply amount obtained through the air supplying process, the reducing process setting the air supply amount per unit time in the air supplying process obtained when the oxygen supplying process and the air supplying process are simultaneously executed to be lower than the air supply amount per unit time in the air supplying process obtained when the oxygen supplying process and the air supplying process are not simultaneously executed.

When the air supplying process and the oxygen supplying process for the regenerating process are simultaneously executed, the amount of oxygen would be insufficient in a case in which only one of the air supplying process and the oxygen supplying process is executed. In such a case, the amount of oxygen is compensated for by the other one of the processes. This allows the regeneration of the filter to be completed quickly. However, when the air supplying process and the oxygen supplying process are simultaneously executed, the amount of oxygen supplied to the filter becomes excessive. This may overheat the filter. The above controller reduces the amount of oxygen that is supplied by the air supply device. Thus, the controller limits situations in which an excessive amount of oxygen is supplied, while also using the air supply device to supply the amount of oxygen that would be insufficient if only the oxygen supplying process is executed. That is, the controller allows the regenerating process to be completed quickly while also limiting overheating of the filter.

In the controller for the vehicle, the reducing process sets the air supply amount per unit time to be smaller as a deposition amount of particulate matter in the filter obtained when the reducing process is started becomes larger.

As the amount of particulate matter deposited in the filter becomes larger, the overheating of the filter is more likely to be caused by the supply of oxygen. The above configuration controls the amount of air supplied depending on how easily overheating occurs. This limits the overheating of the filter.

In an aspect of the controller, the air pump is an electric air pump. The air supplying process is a process that drives the electric air pump over a specified time at a specified rotation speed when the oxygen supplying process and the air supplying process are not simultaneously executed. The reducing process is a process that sets a rotation speed of the air pump to be smaller than the specified rotation speed. The controller executes a prolonging process that prolongs a time of driving the air pump when executing the reducing process in the air supplying process.

It is difficult for the electric air pump to continue high-load driving for a relatively long time. To solve this problem, the controller protects the air pump by driving the air pump at the specified rotation speed only during the specified time. When the rotation speed is reduced by the reducing process, the load on the air pump is reduced. This prolongs the time of driving the air pump. Thus, when executing the reducing process, the controller executes the prolonging process to prolong the driving time of the air pump. Accordingly, the controller prolongs the period of simultaneously executing the air supplying process and the oxygen supplying process while also protecting the air pump. This allows the regenerating process for the filter to be completed quickly.

In an aspect of the controller for the vehicle, the prolonging process sets a prolonged time to be longer as a deposition amount of particulate matter in the filter obtained when the reducing process is started becomes larger, the prolonged time being a time by which the time of driving the air pump is prolonged.

In the case of setting the rotation speed of the air pump to be lower as the deposition amount of particulate matter obtained when the reducing process is started becomes larger, the load on the air pump becomes smaller as the deposition amount of particulate matter obtained when the reducing process is started becomes larger. That is, the reducing process is performed to set the load on the air pump to be smaller as the deposition amount of particulate matter obtained when the reducing process is started becomes larger. Thus, the air pump can continue to be driven for a longer time. Accordingly, the controller sets the prolonged time in the prolonging process to be longer as the deposition amount of particulate matter obtained when the reducing process is started becomes larger. Hence, the controller adjusts the time of the air supplying process in correspondence with the load on the air pump. Consequently, the controller maximally prolongs the period of simultaneously executing the air supplying process and the oxygen supplying process while also protecting the air pump. This allows the regenerating process for the filter to be completed quickly.

An aspect of the controller for the vehicle executes, as the oxygen supplying process, a deactivating process that stops supply of fuel to a deactivated cylinder and supplies fuel to the remaining cylinders, the deactivated cylinder being one or more of cylinders of the internal combustion engine.

Executing the deactivating process supplies oxygen to the filter through the deactivated cylinder, in which the supply of fuel is stopped.

An aspect of the e controller for the vehicle executes, as the oxygen supplying process, an ignition stopping process that stops performing ignition in cylinders of the internal combustion engine while supplying fuel to the cylinders.

When the ignition stopping process is executed, fuel is not burned in each cylinder. This allows the filter to be supplied with oxygen contained in unburned air-fuel mixture.

An aspect of the controller for the vehicle is employed in a vehicle including a motor that drives an output shaft of the internal combustion engine. The controller executes, as the oxygen supplying process, a motoring process that drives the output shaft using the motor in a state in which supply of fuel to cylinders in the internal combustion engine is stopped and ignition in the cylinders is stopped.

When the motoring process is executed, the internal combustion engine operates like a pump. This allows the air that has passed through the combustion chamber to be delivered to the exhaust passage. Accordingly, the filter is supplied with oxygen.

An aspect of the controller for the vehicle executes, as the oxygen supplying process, a lean operating process that sets an air-fuel ratio of air-fuel mixture in each of cylinders to be higher than a stoichiometric air-fuel ratio.

When the lean operating process is executed, the air-fuel mixture contains an excessive amount of oxygen that cannot be fully burned and consumed. Accordingly, the filter is supplied with oxygen contained in exhaust gas.

Another aspect of the present disclosure may provide a control method for a vehicle that executes various processes according to any one of the above controllers for the vehicle.

A further aspect of the present disclosure may provide a non-transitory computer-readable memory medium that stores a program that causes a processor to execute various processes according to any one of the above controllers for the vehicle.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 500 for a vehicle 10 according to an embodiment will now be described with reference to FIGS. 1 to 6.

Configuration of Vehicle 10

Figure 1:
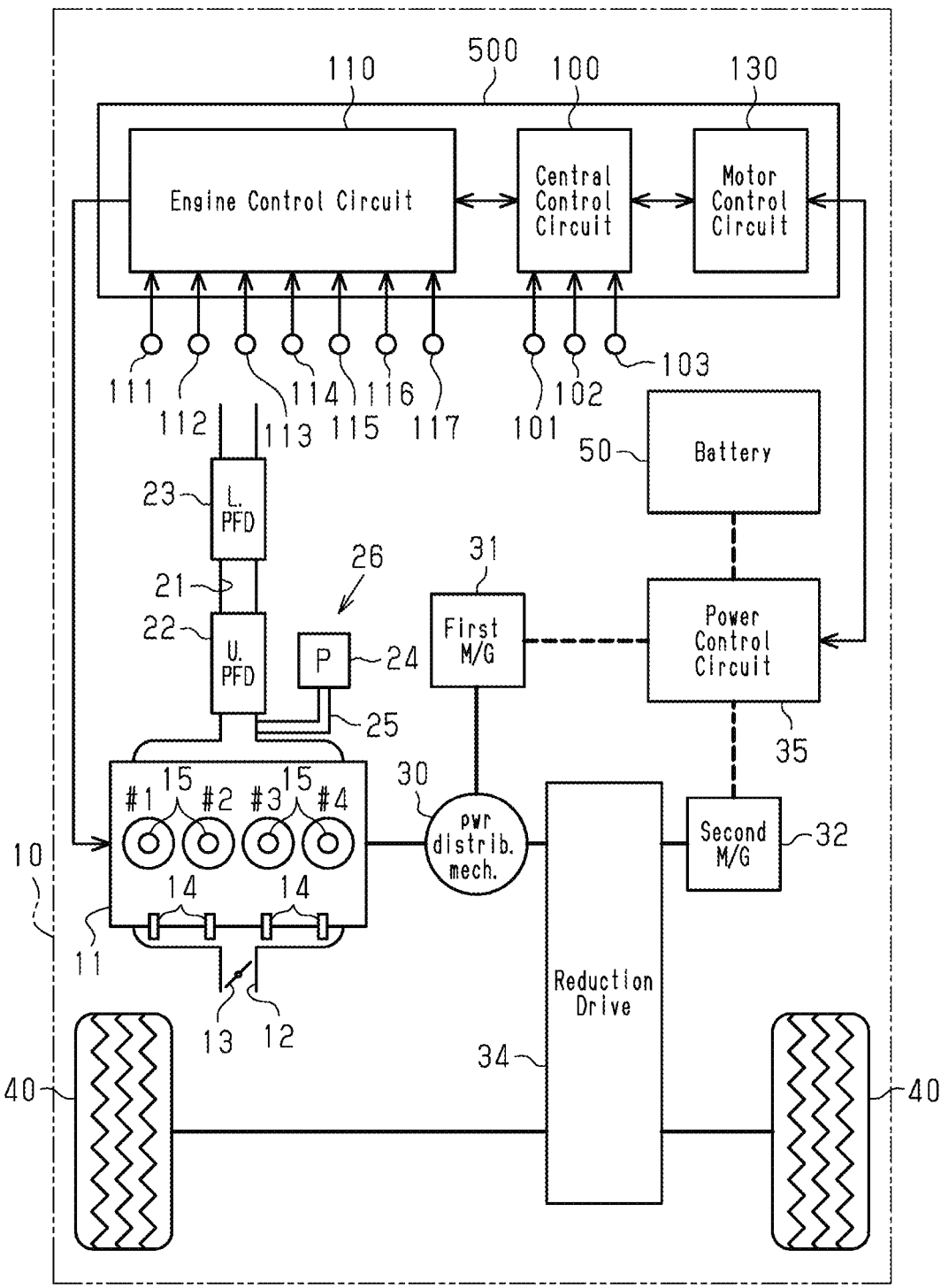
FIG. 1 is a schematic diagram showing the relationship between a controller for a vehicle and a hybrid electric vehicle controlled by the controller.

First, the configuration of the vehicle 10, which is equipped with the controller 500, will be described with reference to FIG. 1. As shown in FIG. 1, the vehicle 10 includes an engine 11 and a second motor generator 32 as a power source. That is, the vehicle 10 is a hybrid electric vehicle.

The engine 11 includes an intake passage 12 and an exhaust passage 21. In the example shown in FIG. 1, the engine 11 includes four cylinders. The intake passage 12 includes a throttle valve 13 that regulates the flow rate of intake air flowing through the intake passage 12. The engine 11 includes injectors 14 that inject fuel into intake air. Each injector 14 is disposed in a corresponding cylinder. Instead, multiple injectors 14 may be disposed in each cylinder. Alternatively, a different number of injectors 14 may be disposed in each cylinder. The engine 11 further includes ignition plugs 15 that ignite air-fuel mixture of fuel and intake air with spark discharge. Each ignition plug 15 is disposed in a corresponding cylinder. Instead, multiple ignition plugs 15 may be disposed in each cylinder. Alternatively, a different number of ignition plugs 15 may be disposed in each cylinder.

The exhaust passage 21 of the engine 11 includes an upstream exhaust purifying device 22 and a downstream exhaust purifying device 23. The downstream exhaust purifying device 23 is located downstream of the upstream exhaust purifying device 22 in the exhaust passage 21. The upstream exhaust purifying device 22 is a three-way catalyst that absorbs NOx. In the downstream exhaust purifying device 23, the three-way catalyst is supported on a particulate filter that traps particulate matter in exhaust gas. That is, the downstream exhaust purifying device 23 is a filter arranged in the exhaust passage 21.

The engine 11 is equipped with an air supply device 26. The air supply device 26 includes an electric air pump 24 and an air supply passage 25. The air pump 24 is connected to the exhaust passage 21 by the air supply passage 25. The air supply passage 25 is connected to a portion upstream of the upstream exhaust purifying device 22 in the exhaust passage 21. The air supply device 26 uses the air pump 24 to draw external air in and draws the air to the exhaust passage 21 through the air supply passage 25.

The second motor generator 32 is connected to a battery 50 via a power control circuit 35 (power control unit). The second motor generator 32 is coupled to driven wheels 40 by a reduction drive 34.

Further, the engine 11 is coupled to the driven wheels 40 by the reduction drive 34 and a power distribution mechanism 30. A first motor generator 31 is also coupled to the power distribution mechanism 30. The first motor generator 31 is, for example, a three-phase alternating-current motor generator. The power distribution mechanism 30 is a planetary gear mechanism that distributes the driving force of the engine 11 to the first motor generator 31 and the driven wheels 40.

The first motor generator 31 receives driving forces from the engine 11 and the driven wheels 40 to generate electric power. When starting the engine 11, the first motor generator 31 serves as a starter that drives a crankshaft, which is an output shaft of the engine 11. In this case, the first motor generator 31 functions as a motor that produces a driving force when supplied with electric power from the battery 50.

The first motor generator 31 and the second motor generator 32 are connected to the battery 50 via the power control circuit 35. The alternating-current power produced by the first motor generator 31 is converted into direct-current power by the power control circuit 35 and charged to the battery 50. That is, the power control circuit 35 functions as an inverter.

Further, the direct-current power of the battery 50 is converted into alternating-current power by the power control circuit 35 and supplied to the second motor generator 32. To decelerate the vehicle 10, the driving force from the driven wheels 40 is used so that electric power is generated by the second motor generator 32. The battery 50 is charged with the generated electric power. That is, regenerative charging is performed in the vehicle 10. In this case, the second motor generator 32 functions as a generator. The alternating-current power produced by the second motor generator 32 is converted into direct-current power by the power control circuit 35 and charged to the battery 50.

When the first motor generator 31 functions as a starter, the power control circuit 35 converts the direct-current power of the battery 50 into alternating-current power and supplies it to the first motor generator 31.

Controller 500

The controller 500 includes control circuitry that controls the engine 11, the first motor generator 31, and the second motor generator 32. The controller 500 includes an engine control circuit 110 (control unit) that controls the engine 11. Further, the controller 500 includes a motor control circuit 130 (control unit) that controls the first motor generator 31 and the second motor generator 32 by controlling the power control circuit 35. Furthermore, the controller 500 includes a central control circuit 100 (control unit) that is connected to the engine control circuit 110 and the motor control circuit 130 and centrally controls the vehicle 10. These control circuits (control units) each include processing circuitry and a memory that stores programs executed by the processing circuitry.

The controller 500 controls the engine 11, the first motor generator 31, and the second motor generator 32. That is, the controller 500 controls the powertrain of the vehicle 10. The controller 500 receives a detection signal from a sensor disposed in each component of the vehicle 10.

Specifically, the central control circuit 100 is connected to an accelerator position sensor 101, a brake sensor 102, and a vehicle speed sensor 103. The accelerator position sensor 101 detects an accelerator open degree. The brake sensor 102 detects the operation amount of a brake. The vehicle speed sensor 103 detects a vehicle speed, which refers to the speed of the vehicle 10.

The engine control circuit 110 is connected to a crank position sensor 111, a coolant temperature sensor 112, and an air flow meter 113. The crank position sensor 111 sends a crank angle signal every time the crankshaft rotates by a certain angle. Based on the crank angle signal, the engine control circuit 110 calculates the rotation phase of the crankshaft and an engine rotation speed NE, which refers to the rotation speed of the crankshaft. The coolant temperature sensor 112 detects a coolant temperature THW, which refers to the temperature of coolant in the engine 11. The air flow meter 113 detects an intake air amount Ga, which is drawn in through the intake passage 12.

The exhaust passage 21 includes an air-fuel ratio sensor 114. The air-fuel ratio sensor 114 is connected to the engine control circuit 110. The air-fuel ratio sensor 114 detects an air-fuel ratio.

Further, the engine control circuit 110 is connected to a differential pressure sensor 115. The differential pressure sensor 115 detects the differential pressure between the pressure of exhaust gas in a portion of the exhaust passage 21 between the upstream and downstream exhaust purifying devices 22, 23 and the pressure of exhaust gas in a portion downstream of the downstream exhaust purifying device 23.

Furthermore, the engine control circuit 110 is connected to an upstream temperature sensor 116. The upstream temperature sensor 116 detects the temperature of exhaust gas flowing between the upstream and downstream exhaust purifying devices 22, 23 in the exhaust passage 21. In addition, the engine control circuit 110 is connected to a downstream temperature sensor 117 that detects the temperature of exhaust gas flowing downstream of the downstream exhaust purifying device 23.

The motor control circuit 130 receives the current, voltage, and temperature of the battery 50 via the power control circuit 35. Based on the current, voltage, and temperature, the motor control circuit 130 calculates a state of charge index value SOC, which is the ratio of the remaining charge to the charging capacity of the battery 50.

The engine control circuit 110 and the motor control circuit 130 are connected to the central control circuit 100 by a communication line. The central control circuit 100, the motor control circuit 130, and the engine control circuit 110 share and exchange the information based on the detection signals received from the sensors and the obtained information through CAN communication.

Control of Vehicle 10

The vehicle 10 uses the electric power stored in the battery 50 to drive the second motor generator 32 and uses only the second motor generator 32 to drive the driven wheels 40, thereby performing motor traveling. Further, the vehicle 10 uses the engine 11 and the second motor generator 32 to drive the driven wheels 40, thereby performing hybrid traveling.

Based on the accelerator open degree, the operation amount of the brake, the vehicle speed, and the state of charge index value SOC, the central control circuit 100 sends a requested power and a requested engine rotation speed for the engine 11 to the engine control circuit 110. Further, the central control circuit 100 sends a requested torque and a target rotation speed for the first motor generator 31 and the second motor generator 32 to the motor control circuit 130.

To achieve the requested power and the requested engine rotation speed, the engine control circuit 110 controls the engine 11. Basically, the engine control circuit 110 executes a fuel injection control such that the air-fuel ratio in each cylinder of the engine 11 becomes a stoichiometric air-fuel ratio. Further, the fuel injection and ignition in the engine 11 are executed in the order of a cylinder #1, a cylinder #3, a cylinder #4, and a cylinder #2.

To achieve the requested torque and the target rotation speed, the motor control circuit 130 controls the first motor generator 31 and the second motor generator 32.

Regeneration of Particulate Filter

As described above, the vehicle 10 includes the downstream exhaust purifying device 23, in which the three-way catalyst is supported on the particulate filter. As the engine 11 runs, a deposition amount DPM of the particulate matter in the particulate filter increases. Thus, in the vehicle 10, after the deposition amount DPM of the particulate matter in the particulate filter increases to a certain level, the particulate filter needs to be regenerated by burning the deposited particulate matter. In the vehicle 10, the particulate matter deposited in the particulate filter is burned by delivering oxygen to the particulate filter in a state in which the particulate filter is sufficiently heated.

Regenerating Process

Figure 2:
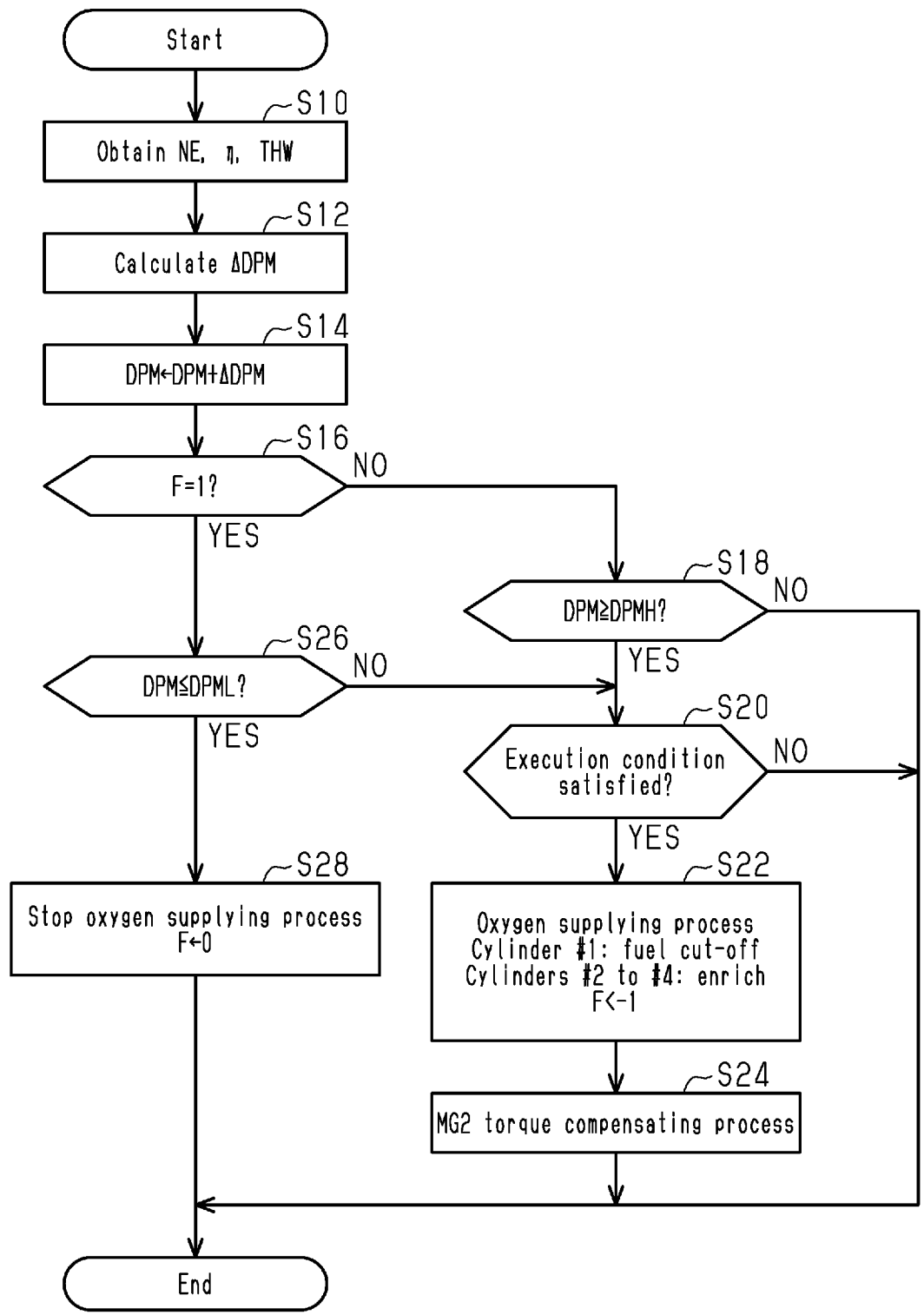
FIG. 2 is a flowchart illustrating the flow of processes in a routine of the regenerating process for the filter of the exhaust passage in the hybrid electric vehicle shown in FIG. 1.

FIG. 2 shows the procedure of a routine of the regenerating process executed by the controller 500. The routine of FIG. 2 is executed by the processing circuitry repeatedly executing programs stored in the memory, for example, in a predetermined cycle. In the following description, the number of each step is represented by the letter S followed by a numeral.

In the routine of FIG. 2, the controller 500 first obtains the engine rotation speed NE, a charging efficiency η, and the coolant temperature THW (S10). The charging efficiency η is calculated by the engine control circuit 110 based on the intake air amount Ga and the rotation speed NE. Next, the controller 500 uses the engine rotation speed NE, the charging efficiency η, and the coolant temperature THW to calculate an update amount ΔDPM of the deposition amount DPM (S12). Specifically, the controller 500 uses the engine rotation speed NE, the charging efficiency η, and the coolant temperature THW to calculate the amount of particulate matter in the exhaust gas discharged to the exhaust passage 21. Further, the controller 500 uses detection values of the upstream and downstream temperature sensors 116, 117 to calculate the temperature of the downstream exhaust purifying device 23. Then, the controller 500 uses the amount of the particulate matter in the exhaust gas and the temperature of the downstream exhaust purifying device 23 to calculate the update amount ΔDPM.

Next, the controller 500 sets the deposition amount DPM to the sum of the deposition amount DPM and the update amount ΔDPM, thereby updating the deposition amount DPM (S14). Subsequently, the controller 500 determines whether a flag F is 1 (S16). When the flag F is 1, it indicates that an oxygen supplying process (described later) is being executed for the regenerating process to burn and remove the particulate matter in the downstream exhaust purifying device 23. When the flag F is 0, it indicates that the oxygen supplying process is not being executed. When determining that the flag F is 0 (S16: NO), the controller 500 determines whether the deposition amount DPM is greater than or equal to a regeneration execution value DPMH (S18). The regeneration execution value DPMH is a threshold value used to determine that particulate matter needs to be removed based on the deposition amount DPM being greater than or equal to the regeneration execution value DPMH.

When determining that the deposition amount DPM is greater than or equal to the regeneration execution value DPMH (S18: YES), the controller 500 determines whether the condition for executing the regenerating process for the downstream exhaust purifying device 23 is satisfied (S20). The execution condition is a condition in which the logical conjunction of the following conditions (A) to (C) is true.

Condition (A): The requested power for the engine 11 is greater than or equal to a predetermined value.
Condition (B): The engine rotation speed NE is greater than or equal to a predetermined speed.
Condition (C): A torque compensating process of S24 can be executed.

When determining that the logical conjunction is true (S20: YES), the controller 500 executes the oxygen supplying process for the regenerating process, thereby substituting 1 into the flag F (S22). In other words, the controller 500 stops the injection of fuel from the injector 14 of the cylinder #1. Further, the controller 500 sets the air-fuel ratio of the air-fuel mixture in cylinders #2 to #4 to be richer than the stoichiometric air-fuel ratio. That is, the oxygen supplying process in the present embodiment is a deactivating process that stops the supply of fuel to a deactivated cylinder and supplies fuel to the remaining cylinders. The deactivated cylinder refers to one or more of the cylinders. The deactivating process is a process that expedites oxidation in the upstream and downstream exhaust purifying devices 22, 23 by emitting oxygen and unburned fuel to the exhaust passage 21. Further, the deactivating process is a process that increases the temperatures of the upstream and downstream exhaust purifying devices 22, 23 to burn and remove the particulate matter trapped by the downstream exhaust purifying device 23. That is, the controller 500 discharges oxygen and unburned fuel to the exhaust passage 21 to burn the unburned fuel and increase the temperature of the exhaust gas in the exhaust purifying devices (22, 23). This increases the temperature of the downstream exhaust purifying device 23. In addition, oxygen is supplied to the downstream exhaust purifying device 23 to burn and remove the particulate matter trapped by the downstream exhaust purifying device 23.

The deactivated cylinder, in which the supply of fuel is stopped, is not limited to the cylinder #1. For example, the deactivated cylinder, in which the supply of fuel is stopped, may be switched in sequence such that the number of times the supply of fuel is stopped does not significantly vary between the cylinders.

Next, the controller 500 executes a process that compensates for torque fluctuation of the crankshaft of the engine 11 resulting from the stop of combustion control on the cylinder #1 (S24). In this process, the power control circuit 35 superimposes a compensation torque on the torque of traveling requested for the second motor generator 32. Then, the motor control circuit 130 operates the power control circuit 35 based on the requested torque, on which the compensation torque is superimposed.

The condition for executing the torque compensating process is that no anomaly has occurred in the second motor generator 32, the battery 50 stores the electric power needed to execute the torque compensating process, and the like.

When determining that the flag F is 1 (S16: YES), the controller 500 determines whether the deposition amount DPM is less than or equal to a stop threshold value DPML (S26). The stop threshold value DPML is a threshold value used to determine that the regenerating process can be stopped based on the deposition amount DPM being less than or equal to the stop threshold value DPML. When determining that the deposition amount DPM is less than or equal to the stop threshold value DPML (S26: YES), the controller 500 stops the regenerating process to substitute 0 into the flag F (S28).

When the process of S24, S28 is completed or when making a negative determination in the process of S18, S20, the controller 500 temporarily ends the routine of FIG. 2.

Air Supplying Process

To quickly warm up the catalyst in the upstream exhaust purifying device 22 to an activation temperature, the controller 500 uses the air supply device 26 to execute the air supplying process. Specifically, the controller 500 drives the air pump 24 over a specified time TAI to draw air into the exhaust passage 21 through the air supply passage 25. Thus, the air is supplied to the upstream exhaust purifying device 22. The air supplying process is executed during a cold start of the engine 11. Specifically, the controller 500 executes the air supplying process when the condition for executing the air supplying process is satisfied. The condition for executing the air supplying process is a logical conjunction of the following conditions: (i) the coolant temperature THW is less than a threshold value (e.g., 60° C.); (ii) the start of the engine 11 is completed; (iii) the coolant temperature THW is greater than or equal to 0° C.; and (iv) the air pump 24 has no anomaly. The condition (iii), in which the coolant temperature THW is greater than or equal to 0° C., is used to avoid situations in which the air pump 24 is driven in a state in which condensed water in the air supply passage 25 is frozen.

When the air supplying process is executed during a cold start of the engine 11 to supply air to the upstream exhaust purifying device 22, the oxidization in the upstream exhaust purifying device 22 expedites the warm-up.

While the controller 500 is operating, the engine 11 runs when the coolant temperature THW is increased by continuing motor traveling, which only uses the second motor generator 32 as a traveling drive source of the vehicle 10 instead of using the engine 11. Thus, the air supplying process is executed only once while the controller 500 is operating, and will not be executed later. Further, there may be a case in which the air supplying process is not executed when the coolant temperature THW is relatively high.

When the air supplying process and the oxygen supplying process for the regenerating process are simultaneously executed, the amount of oxygen would be insufficient in a case in which only the oxygen supplying process is executed. In such a case, the amount of oxygen is compensated for by the air supplying process. This allows the regeneration of the downstream exhaust purifying device 23 to be completed quickly. However, when the air supplying process and the oxygen supplying process for the regenerating process are simultaneously executed, the amount of oxygen supplied to the downstream exhaust purifying device 23 becomes excessive. This may overheat the downstream exhaust purifying device 23.

Figure 3:
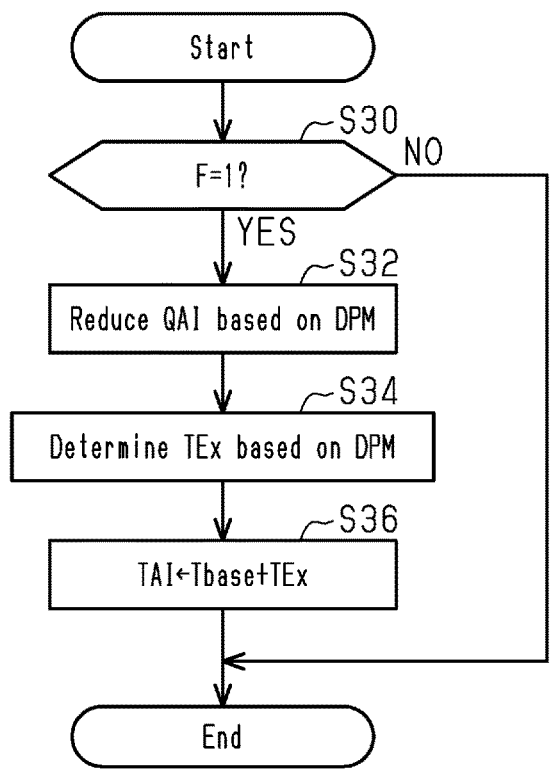
FIG. 3 is a flowchart illustrating the flow of processes in a routine of the reducing process and the prolonging process executed during the air supplying process in the hybrid electric vehicle shown in FIG. 1.

To solve this problem, when executing the air supplying process, the controller 500 of the present embodiment executes the routine of FIG. 3 to adjust the amount of driving the air pump 24 in the air supplying process.

FIG. 3 shows the procedure of a routine of the reducing process and the prolonging process executed by the controller 500 during the air supplying process. The routine of FIG. 3 is executed by the processing circuitry repeatedly executing programs stored in the memory, for example, in a predetermined cycle until the reducing process is executed during the execution of the air supplying process. In the following description, the number of each step is represented by the letter S followed by a numeral.

In the routine of FIG. 3, the controller 500 first determines whether the flag F is 1 (S30). This determination process is the same as the process of S16, which has been described with reference to FIG. 2. When determining that the flag F is 1 (S30: YES), the controller 500 reduces a supplied air flow rate QAI based on the deposition amount DPM (S32). The supplied air flow rate QAI is the amount of air supplied to the exhaust passage 21 by the air supply device 26 per unit time. The air supply device 26 drives the air pump 24 to supply air. Thus, the controller 500 controls the rotation speed of the air pump 24 to regulate the supplied air flow rate QAI. In the process of S32, the controller 500 determines the rotation speed of the air pump 24 based on the deposition amount DPM.

Figure 4:
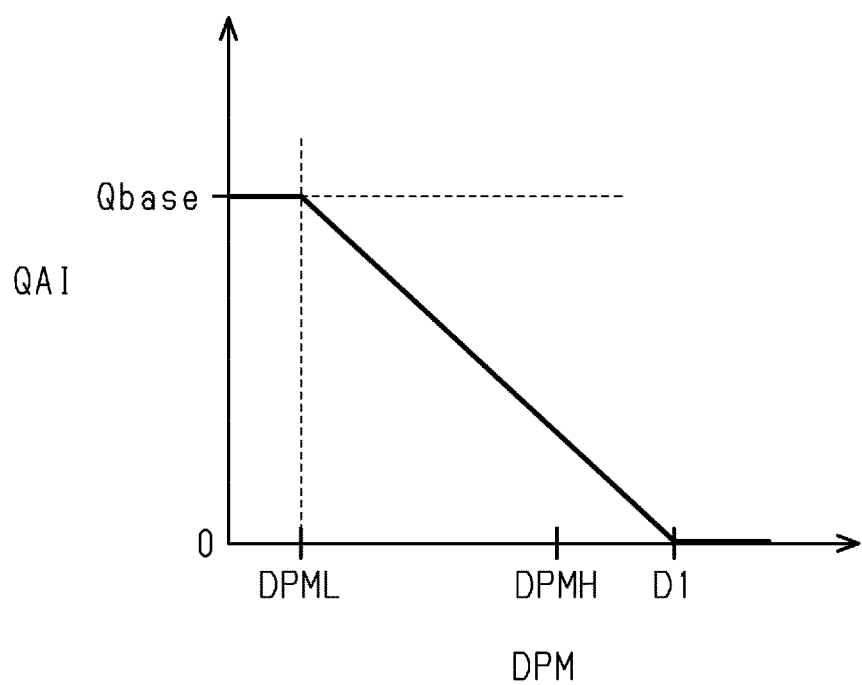
FIG. 4 is a graph showing the relationship between the deposition amount in the filter and the supplied air flow rate in the reducing process of FIG. 3.

As shown in FIG. 4, when the deposition amount DPM is less than or equal to the stop threshold value DPML (i.e., when the oxygen supplying process is not executed), the rotation speed of the air pump 24 is set such that the supplied air flow rate QAI becomes a base flow rate Qbase. In the process of S32, in a case in which the deposition amount DPM is greater than the stop threshold value DPML as shown in FIG. 4, the rotation speed of the air pump 24 is determined such that the supplied air flow rate QAI decreases as the deposition amount DPM increases. In a case in which the deposition amount DPM is greater than or equal to a threshold value D1, the rotation speed of the air pump 24 is determined such that the supplied air flow rate QAI becomes 0 (i.e., such that the air pump 24 stops). The threshold value D1 is set based on a lower limit value of the deposition amount DPM at which the downstream exhaust purifying device 23 may potentially be overheated by simultaneously executing the oxygen supplying process and the air supplying process. The threshold value D1 is greater than the regeneration execution value DPMH.

Specifically, the process of S32 is the reducing process related to the air supply amount obtained through the air supplying process. In the reducing process, the air supply amount per unit time in the air supplying process when the oxygen supplying process and the air supplying process are simultaneously executed is set to be smaller than the air supply amount per unit time in the air supplying process when the oxygen supplying process and the air supplying process are not simultaneously executed. In other words, in the process of S32, during the execution of the air supplying process, the amount of air supplied per unit time in the air supplying process is set to be smaller when the oxygen supplying process is simultaneously executed than when the oxygen supplying process is not simultaneously executed. When the deposition amount DPM is so large that the downstream exhaust purifying device 23 would be overheated, the controller 500 stops the air pump 24 so that the air supplying process is stopped.

When executing the process of S32 to reduce the rotation speed of the air pump 24, the controller 500 determines a prolonged time TEx based on the deposition amount DPM (S34). As described above, the air supplying process is a process that drives the air pump 24 over the specified time TAI. When the oxygen supplying process is not executed, the specified time TAI is a base time Tbase (e.g., one minute). The prolonged time TEx is a time during which the air pump 24 continues to be driven subsequent to the base time Tbase in the air supplying process. That is, the prolonged time TEx is a time by which the specified time TAI of driving the air pump 24 is prolonged.

Figure 5:
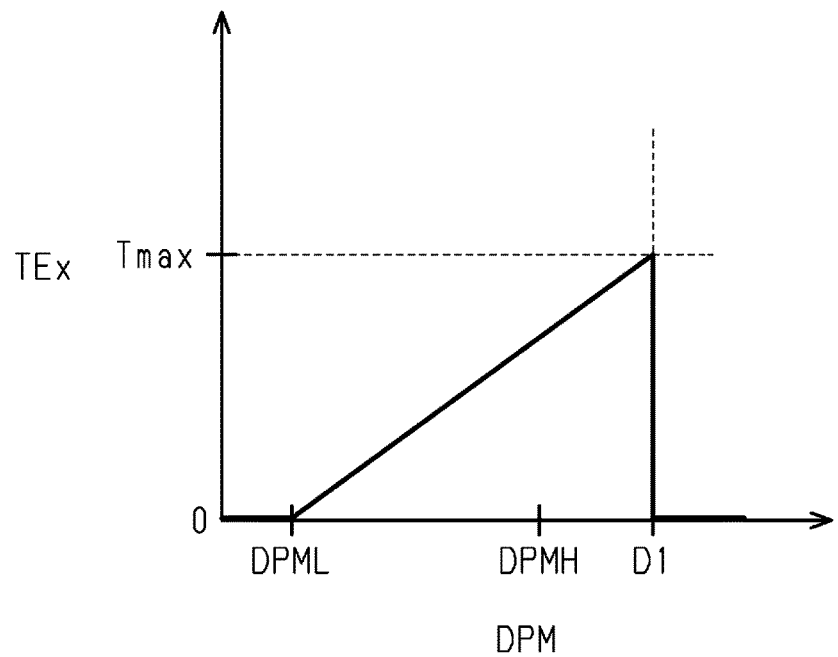
FIG. 5 is a graph showing the relationship between the deposition amount in the filter and the prolonged time in the prolonging process of FIG. 3.

As shown in FIG. 5, the prolonged time TEx is 0 when the deposition amount DPM is less than or equal to the stop threshold value DPML (i.e., when the oxygen supplying process is not executed). Likewise, the prolonged time TEx is determined as 0 when the deposition amount DPM is greater than or equal to the threshold value D1 (i.e., when the air pump 24 is stopped). When the deposition amount DPM is greater than the stop threshold value DPML and less than the threshold value D1, the prolonged time TEx is determined as being longer in the process of S34 as the deposition amount DPM becomes larger. The maximum value Tmax of the prolonged time TEx is, for example, less than several minutes.

When determining the prolonged time TEx through the process of S34, the controller 500 updates the specified time TAI by setting the sum of the base time Tbase and the prolonged time TEx as a new specified time TAI. That is, the processes of S34 and S36 are processes that prolong the specified time TAI by setting the prolonged time TEx to be longer as the deposition amount DPM obtained when the reducing process is started becomes larger.

When the process of S36 is completed, the controller 500 ends the routine.

When determining that the flag F is 0 (S30: NO), the controller 500 temporarily ends the routine without executing the processes of S32 to S36.

Operation of Present Embodiment

Figure 6:
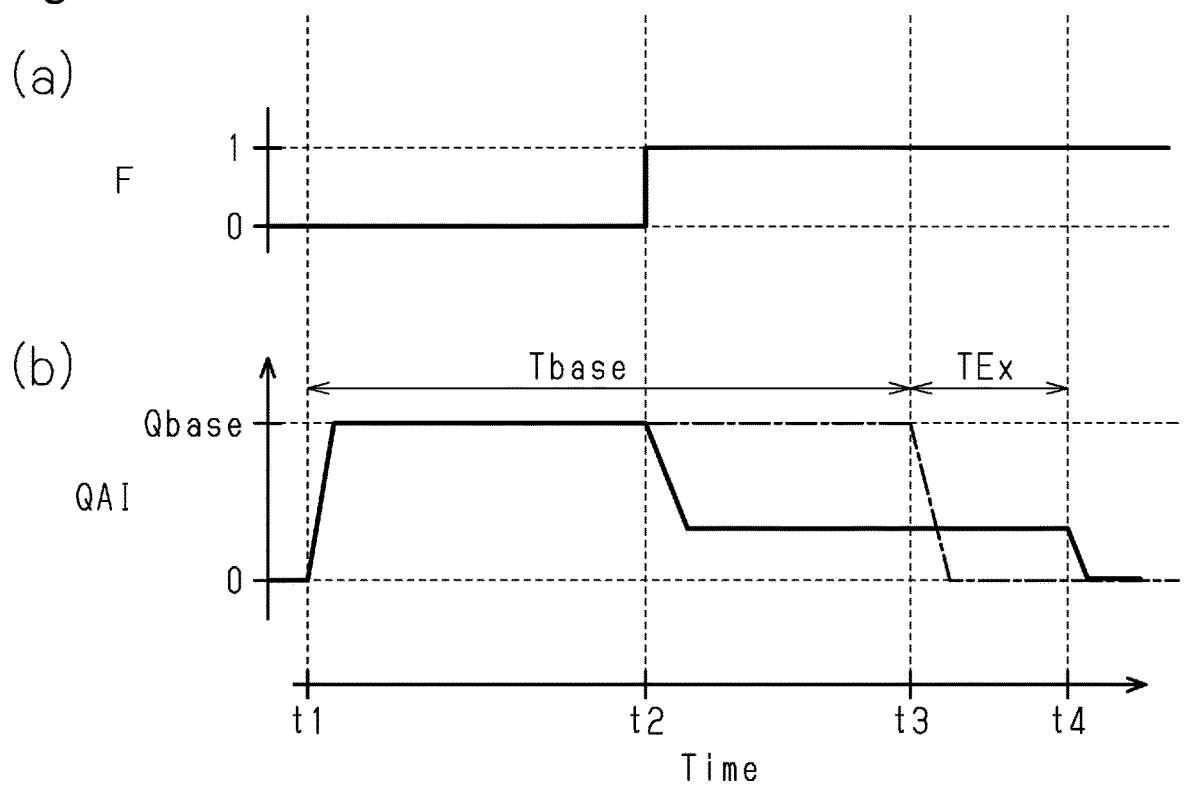
FIG. 6 is a timing diagram illustrating changes in the flag F and changes in the supplied air flow rate along the flowchart of FIG. 3, in which section (a) of FIG. 6 illustrates the changes in the flag F and section (b) of FIG. 6 illustrates the changes in the supplied air flow rate.

The operation of the controller 500 will now be described with reference to FIG. 6. FIG. 6 is a timing diagram illustrating changes in the flag F and the supplied air flow rate QAI in a case in which the oxygen supplying process is started from some point during execution of the air supplying process. In FIG. 6, the alternate long and short dashed line illustrates a comparative example, in which changes occur in the supplied air flow rate QAI obtained when the reducing process and the prolonging process are not executed.

As shown in section (b) of FIG. 6, at time t1, when the air supplying process is started, the air pump 24 is driven and thus the supplied air flow rate QAI increases. At this time, since the oxygen supplying process is not executed, the flag F is 0 (S30: NO).

As shown in section (a) of FIG. 6, at time t2, when the oxygen supplying process is started, the flag F becomes 1 (S30: YES). Then, the reducing process is executed (S32). Thus, as shown in section (b) of FIG. 6, the supplied air flow rate QAI is reduced. Further, since the prolonging process is executed (S34), the specified time TAI is prolonged to a length obtained by adding the prolonged time TEx to the base time Tbase.

Accordingly, from times t2 to t4, the oxygen supplying process and the air supplying process, in which the supplied air flow rate QAI is reduced, are simultaneously executed. At time t4, when the specified time TAI passes, the driving of the air pump 24 is stopped and thus the air supplying process ends. The oxygen supplying process continues subsequent to time t4. This is because the completion of the regenerating process for the downstream exhaust purifying device 23 through the oxygen supplying process needs several tens of times.

In the section (b) of FIG. 6, the alternate long and short dashed line shows the supplied air flow rate QAI in the comparative example, in which the reducing process and the prolonging process are not executed. As shown by the alternate long and short dashed line, in the comparative example, in which the reducing process and the prolonging process are not executed, the supplied air flow rate QAI remains the base flow rate Qbase even after the oxygen supplying process is started at time t2. As shown by the alternate long and short dashed line, in the comparative example, at time t3, when the specified time TAI passes, the driving of the air pump 24 is stopped and thus the air supplying process ends.

When the air supplying process and the oxygen supplying process are simultaneously executed, the regeneration of the downstream exhaust purifying device 23 is completed quickly. However, in the comparative example, the air supplying process and the oxygen supplying process for the regenerating process are simultaneously executed without reducing the supplied air flow rate QAI. In such a case, the amount of oxygen supplied becomes excessive. This may overheat the downstream exhaust purifying device 23.

In contrast, the controller 500 of the present embodiment executes the reducing process when executing the air supplying process. In the reducing process, the supplied air flow rate QAI in the air supplying process is set to be smaller when the oxygen supplying process is simultaneously executed than when the oxygen supplying process is not simultaneously executed. Accordingly, the controller 500 reduces the amount of oxygen supplied by the air supply device 26 when simultaneously executing the air supplying process and the oxygen supplying process.

Advantages of Present Embodiment (1) The controller 500 limits situations in which an excessive amount of oxygen is supplied, while also using the air supply device 26 to supply (i.e., add) the amount of oxygen that would be insufficient if only the oxygen supplying process is executed. That is, the controller 500 allows the regenerating process to be completed quickly while also limiting overheating of the downstream exhaust purifying device 23.

(2) As described with reference to FIG. 4, the controller 500 executes the reducing process to set the supplied air flow rate QAI to be smaller as the deposition amount DPM obtained when the reducing process is started becomes larger. As the deposition amount DPM becomes larger, the overheating of the downstream exhaust purifying device 23 is more likely to be caused by the supply of oxygen. The controller 500 controls the amount of air supplied depending on how easily overheating occurs, thereby limiting the occurrence of overheating.

(3) The electric air pump 24 cannot continue high-load driving for a relatively long time. To solve this problem, the controller 500 protects the air pump 24 by driving the air pump 24 at the specified rotation speed only during the specified time TAI. When the rotation speed is reduced by the reducing process, the load on the air pump 24 is reduced. This prolongs the time of driving the air pump 24. Thus, when executing the reducing process, the controller 500 executes the prolonging process to set the driving time of the air pump 24 to be longer than the base time Tbase. Accordingly, the controller 500 prolongs the period of simultaneously executing the air supplying process and the oxygen supplying process while also protecting the air pump 24. This allows the regenerating process for the downstream exhaust purifying device 23 to be completed quickly.

(4) In the case of setting the rotation speed of the air pump 24 to be lower as the deposition amount DPM obtained when the reducing process is started becomes larger, the load on the air pump 24 becomes smaller as the deposition amount DPM obtained when the reducing process is started becomes larger. That is, the reducing process is performed to set the load on the air pump 24 to be smaller as the deposition amount DPM obtained when the reducing process is started becomes larger. Thus, the air pump 24 can continue to be driven for a longer time. Accordingly, as described with reference to FIG. 5, the controller 500 sets the prolonged time TEx in the prolonging process to be longer as the deposition amount DPM obtained when the reducing process is started becomes larger. Hence, the controller 500 adjusts the time of the air supplying process in correspondence with the load on the air pump 24. Consequently, the controller 500 maximally prolongs the period of simultaneously executing the air supplying process and the oxygen supplying process while also protecting the air pump 24, thereby allowing the regenerating process to be completed quickly.

Modifications

The present embodiment may be modified as follows. The present embodiment and the following modifications can be combined as long as they remain technically consistent with each other.

Figure 7:
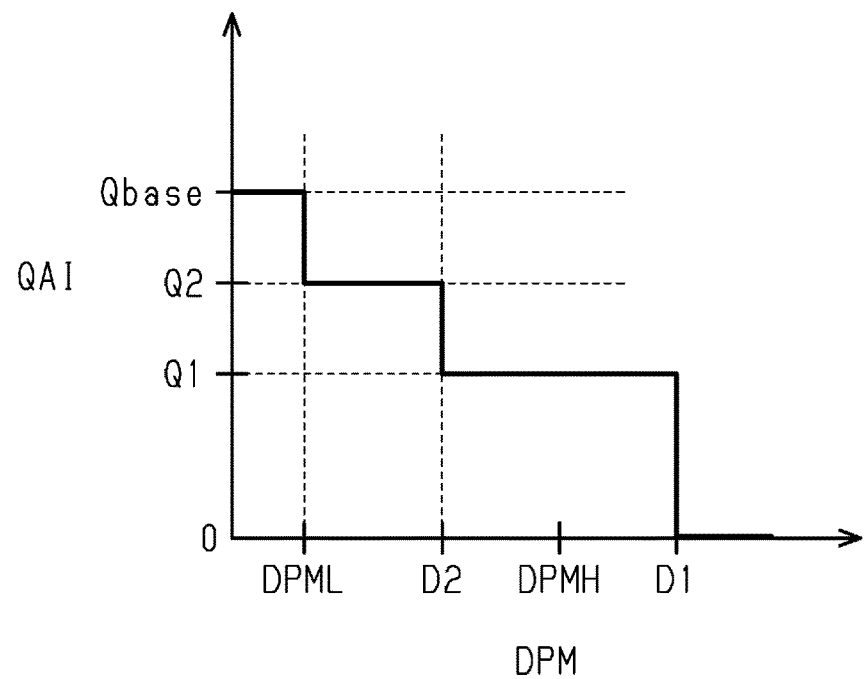
FIG. 7 is a graph showing the relationship between the deposition amount in the filter and the supplied air flow rate in a modification of FIG. 4.

In the above embodiment, as shown in FIG. 4, the reducing process is performed to reduce the rotation speed of the air pump 24 such that the supplied air flow rate QAI becomes smaller as the deposition amount DPM becomes larger. However, the supplied air flow rate QAI does not have to be reduced in the reducing process in this manner. For example, as shown in FIG. 7, the supplied air flow rate QAI may be set in correspondence with each of the deposition amounts DPM at multiple stages. In the modification of FIG. 7, when the deposition amount DPM is greater than the stop threshold value DPML and less than a threshold value D2, the supplied air flow rate QAI is set to Q2. The threshold value D2 is less than the threshold value D1. When the deposition amount DPM is greater than the threshold value D2 and less than the threshold value D1, the supplied air flow rate QAI is set to Q1. Q1 is less than Q2. In this manner, the reducing process may be performed to set the supplied air flow rate QAI in a stepwise manner in correspondence with the deposition amount DPM.

Figure 8:
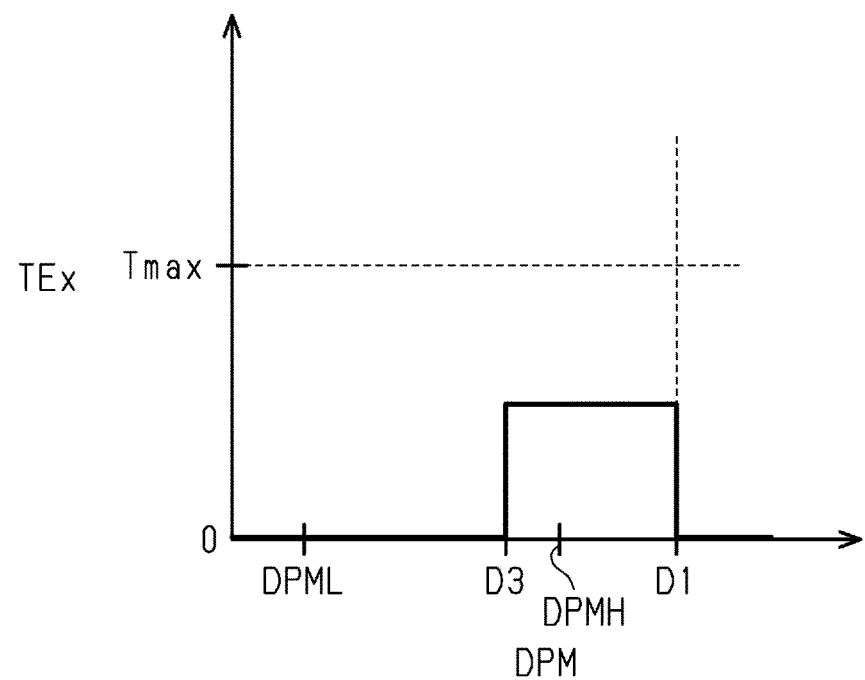
FIG. 8 is a graph showing the relationship between the deposition amount in the filter and the prolonged time in another modification of FIG. 5.

In the above embodiment, as shown in FIG. 5, the prolonging process is performed to prolong the specified time TAI such that the prolonged time TEx becomes longer as the deposition amount DPM becomes larger. However, the specified time TAI does not have to be prolonged in the reducing process in this manner. For example, as shown in FIG. 8, the prolonged time TEx may be set such that the specified time TAI is prolonged only when the deposition amount DPM is large to a certain extent (i.e., when the supplied air flow rate QAI is lowered to a certain extent by the reducing process). In the modification of FIG. 8, the prolonged time TEx is set only when the deposition amount DPM is greater than or equal to a threshold value D3 and less than the threshold value D1. Thus, the prolonging process is substantially executed only when the deposition amount DPM is greater than or equal to the threshold value D3 and less than the threshold value D1. The threshold value D3 is less than the threshold value D1. Alternatively, the prolonged time TEx, which is set by the prolonging process, may be set in a stepwise manner in correspondence with the deposition amount DPM.

The prolonging process may be omitted. That is, although the reducing process is executed in the air supplying process, the air pump 24 may be constantly driven only during the base time Tbase without executing the prolonging process.

In the above embodiment, examples of the oxygen supplying process in the present embodiment include the deactivating process, which stops the supply of fuel to the deactivated cylinder (one or more of the cylinders) and supplies fuel to the remaining cylinders. However, the oxygen supplying process is not limited to the deactivating process. The oxygen supplying process only needs to be a process that supplies the filter, through the exhaust passage 21, with oxygen that has been passed through the combustion chamber of the engine 11.

As the oxygen supplying process, an ignition stopping process may be executed to stop performing ignition in the cylinders of the engine 11 while supplying fuel to the cylinders. When the ignition stopping process is executed, fuel is not burned in each cylinder. This allows the filter to be supplied with oxygen contained in unburned air-fuel mixture.

As the oxygen supplying process, a motoring process may be executed. In the motoring process, a motor (e.g., the first motor generator 31 or the second motor generator 32) is used to drive the crankshaft in a state in which the supply of fuel to the cylinders in the engine 11 and ignition in the cylinders are stopped. When the motoring process is executed, the engine 11 operates like a pump. This allows the air that has passed through the combustion chamber to be delivered to the exhaust passage 21. Accordingly, the filter is supplied with oxygen.

As the oxygen supplying process, a lean operating process may be executed to set the air-fuel ratio of air-fuel mixture in each cylinder to be higher than the stoichiometric air-fuel ratio. When the lean operating process is executed, the air-fuel mixture contains an excessive amount of oxygen that cannot be fully burned and consumed. Accordingly, the filter is supplied with oxygen contained in exhaust gas.

In the above example, the engine 11 of the vehicle 10 is a straight-four engine, which includes four cylinders. However, the internal combustion engine controlled by the controller 500 is not limited to a straight-four engine. The internal combustion engine may be a V engine, a W engine, or a horizontally opposed engine, in which each bank includes an exhaust purifying device. In this case, the deactivating process is designed to stop the supply of fuel to at least one of the cylinders in each of the banks in one cycle. This allows a sufficient amount of oxygen to be delivered to the exhaust purifying device of each bank of the V engine or the like.

In the above example, the upstream and downstream exhaust purifying devices 22, 23 are arranged, and the downstream exhaust purifying device 23 serves as a particulate filter. However, the exhaust purification devices do not need to have such a configuration. The same configuration as the embodiment may be employed as long as the controller 500 controls the vehicle 10 equipped with an internal combustion engine including at least a particulate filter.

The configuration of the powertrain in the vehicle 10 does not have to be the one shown in FIG. 1. The same configuration as the embodiment may be employed as long as the controller 500 controls the vehicle 10 and can execute the torque compensating process using a motor.

The torque compensating process does not have to be executed. Thus, the vehicle 10 does not have to be a hybrid electric vehicle that includes a motor.

Predetermined conditions that permit the execution of the regenerating process are not limited to the ones in the above embodiment. For example, only one or two of the above three conditions (A) to (C) may be included. Alternatively, the predetermined conditions may include a condition other than the three conditions or does not have to include any one of the three conditions.

The process that estimates the deposition amount DPM is not limited to the one illustrated in FIG. 2. For example, the deposition amount DPM may be estimated using the intake air amount Ga and the pressure difference between the upstream and downstream sides of the downstream exhaust purifying device 23, which is detected by the differential pressure sensor 115. Specifically, the deposition amount DPM is estimated to be a larger value when the pressure difference is relatively large than when the pressure difference is relatively small. Thus, even when the pressure difference is the same, the deposition amount DPM is estimated to be a larger value when the intake air amount Ga is relatively small than when the intake air amount Ga is relatively large.

The downstream exhaust purifying device 23 is not limited to a filter supported by the three-way catalyst and may only include a filter. The downstream exhaust purifying device 23 does not have to be located downstream of the upstream exhaust purifying device 22 in the exhaust passage 21. The same configuration as the above embodiment may be employed in the controller 500 that controls the vehicle 10 including the engine 11 and executes air supplying process to expedite warm-up of the filter (corresponding to the downstream exhaust purifying device 23) in which the three-way catalyst is supported.

The control circuitry of the controller 500 includes the engine control circuit 110, the motor control circuit 130, and the central control circuit 100. These control circuits (control units) may include one or more processors that execute various processes in accordance with a computer program (software). These control circuits (control units) may be one or more dedicated hardware circuits such as application specific integrated circuits (ASICs) that execute at least part of various processes. These control units may also include a combination thereof. The processor includes a CPU and a memory such as a RAM and a ROM. The memory stores program codes or commands configured to cause the CPU to execute processes. The memory, or a computer-readable medium, includes any type of media that are accessible by general-purpose computers and dedicated computers.

The vehicle 10 is not limited to a series-parallel hybrid electric vehicle and may be, for example, a parallel hybrid electric vehicle or a series hybrid electric vehicle. The hybrid electric vehicle may be replaced with, for example, a vehicle 10 in which only the engine 11 is used as a power generation device for the vehicle 10.

The phrase "at least one of" as used in this description means "one or more" of a desired choice. For example, the phrase "at least one of" as used in this description means "only one choice" or "both of two choices" in a case in which the number of choices is two. In another example, the phrase "at least one of" as used in this description means "only one single choice" or "any combination of two or more choices" if the number of its choices is three or more.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a vehicle, the controller comprising control circuitry, and the vehicle for which the controller is employed being equipped with an internal combustion engine, wherein the control circuitry is configured to execute:

an air supplying process that supplies air to a filter in an exhaust passage by driving an air pump of an air supply device, the internal combustion engine including the air supply device, the air supply device including the air pump and an air supply passage connected to a portion upstream of the filter in the exhaust passage, and the air supplying process drawing air into the exhaust passage through the air supply passage by driving the air pump so that the air drawn into the exhaust passage is supplied to the filter;

an oxygen supplying process that supplies oxygen to the filter through the exhaust passage, the oxygen having been passed through a combustion chamber of the internal combustion engine; and a reducing process related to an air supply amount obtained through the air supplying process, the reducing process setting the air supply amount per unit time in the air supplying process obtained when the oxygen supplying process and the air supplying process are simultaneously executed to be lower than the air supply amount per unit time in the air supplying process obtained when the oxygen supplying process and the air supplying process are not simultaneously executed, wherein when the oxygen supplying process is started during execution of the air supplying process, the air supply amount supplied by the air supplying process is reduced, and a time of the air supplying process is prolonged.

2. The controller for the vehicle according to claim 1, wherein the reducing process sets the air supply amount per unit time to be smaller as a deposition amount of particulate matter in the filter obtained when the reducing process is started becomes larger.

3. The controller for the vehicle according to claim 1, wherein the air pump is an electric air pump, the air supplying process is a process that drives the electric air pump over a specified time at a specified rotation speed when the oxygen supplying process and the air supplying process are not simultaneously executed, the reducing process is a process that sets a rotation speed of the air pump to be smaller than the specified rotation speed, and the control circuitry is configured to execute a prolonging process that prolongs a time of driving the air pump when executing the reducing process in the air supplying process.

4. The controller for the vehicle according to claim 3, wherein the prolonging process sets a prolonged time to be longer as a deposition amount of particulate matter in the filter obtained when the reducing process is started becomes larger, the prolonged time being a time by which the time of driving the air pump is prolonged.

5. The controller for the vehicle according to claim 1, wherein the control circuitry is configured to execute, as the oxygen supplying process, a deactivating process that stops supply of fuel to a deactivated cylinder and supplies fuel to the remaining cylinders, the deactivated cylinder being one or more of cylinders of the internal combustion engine.

6. The controller for the vehicle according to claim 1, wherein the control circuitry is configured to execute, as the oxygen supplying process, an ignition stopping process that stops performing ignition in cylinders of the internal combustion engine while supplying fuel to the cylinders.

7. The controller for the vehicle according to claim 1, wherein the vehicle in which the control circuitry is employed includes a motor that drives an output shaft of the internal combustion engine, and the control circuitry is configured to execute, as the oxygen supplying process, a motoring process that drives the output shaft using the motor in a state in which supply of fuel to cylinders in the internal combustion engine is stopped and ignition in the cylinders is stopped.

8. The controller for the vehicle according to claim 1, wherein the control circuitry is configured to execute, as the oxygen supplying process, a lean operating process that sets an air-fuel ratio of air-fuel mixture in each of cylinders to be higher than a stoichiometric air-fuel ratio.

9. The controller for the vehicle according to claim 1, wherein when a deposition amount of particulate matter in the filter is less than or equal to the stop threshold value and when the oxygen supplying process is not executed, a rotation speed of the air pump is set such that the air supply amount becomes a base air supply amount, in a case in which the deposition amount is greater than the stop threshold value, the rotation speed of the air pump is determined such that the air supply amount decreases as the deposition amount increases.

10. The controller for the vehicle according to claim 9, wherein in a case in which the deposition amount is greater than or equal to a threshold value, the rotation speed of the air pump is determined such that the air supply amount becomes 0, the threshold value is set based on a lower limit value of the deposition amount at which the filter may potentially be overheated by simultaneously executing the oxygen supplying process and the air supplying process.

11. The controller for the vehicle according to claim 10, wherein the threshold value is greater than the regeneration execution value, the regeneration execution value is a threshold value used to determine that the particulate matter needs to be removed based on the deposition amount being greater than or equal to the regeneration execution value.

12. The controller for the vehicle according to claim 9, wherein the air supply amount supplied by the reducing process is set in a stepwise manner in correspondence with a deposition amount of particulate matter in the filter.

13. The controller for the vehicle according to claim 11, wherein the prolonging process is executed only when the air supply amount is lowered to a certain extent by the reducing process.

14. The controller for the vehicle according to claim 2, wherein the deposition amount of particulate matter in the filter is determined based on the engine rotation speed, a charging efficiency, and a coolant temperature.

15. The controller for the vehicle according to claim 2, wherein the deposition amount of particulate matter in the filter is determined based on a pressure difference between upstream and downstream sides of the filter.

16. A control method for a vehicle, the vehicle for which the control method is employed being equipped with an internal combustion engine, the control method comprising:

executing an air supplying process that supplies air to a filter in an exhaust passage by driving an air pump of an air supply device, the internal combustion engine including the air supply device, the air supply device including the air pump and an air supply passage connected to a portion upstream of the filter in the exhaust passage, and the air supplying process drawing air into the exhaust passage through the air supply passage by driving the air pump so that the air drawn into the exhaust passage is supplied to the filter;

executing an oxygen supplying process that supplies oxygen to the filter through the exhaust passage, the oxygen having been passed through a combustion chamber of the internal combustion engine; and executing a reducing process related to an air supply amount obtained through the air supplying process, the reducing process setting the air supply amount per unit time in the air supplying process obtained when the oxygen supplying process and the air supplying process are simultaneously executed to be lower than the air supply amount per unit time in the air supplying process obtained when the oxygen supplying process and the air supplying process are not simultaneously executed, wherein when the oxygen supplying process is started during execution of the air supplying process, the air supply amount supplied by the air supplying process is reduced, and a time of the air supplying process is prolonged.

17. The controller for the vehicle according to claim 16, wherein the deposition amount of particulate matter in the filter is determined based on the engine rotation speed, a charging efficiency, and a coolant temperature.

18. The controller for the vehicle according to claim 16, wherein the deposition amount of particulate matter in the filter is determined based on a pressure difference between upstream and downstream sides of the filter.

19. A non-transitory computer-readable medium that stores a program for causing a processor to execute a control process for a vehicle, the vehicle for which the control process employed being equipped with an internal combustion engine, the control process comprising:

executing an air supplying process that supplies air to a filter in an exhaust passage by driving an air pump of an air supply device, the internal combustion engine including the air supply device, the air supply device including the air pump and an air supply passage connected to a portion upstream of the filter in the exhaust passage, and the air supplying process drawing air into the exhaust passage through the air supply passage by driving the air pump so that the air drawn into the exhaust passage is supplied to the filter;

executing an oxygen supplying process that supplies oxygen to the filter through the exhaust passage, the oxygen having been passed through a combustion chamber of the internal combustion engine; and executing a reducing process related to an air supply amount obtained through the air supplying process, the reducing process setting the air supply amount per unit time in the air supplying process obtained when the oxygen supplying process and the air supplying process are simultaneously executed to be lower than the air supply amount per unit time in the air supplying process obtained when the oxygen supplying process and the air supplying process are not simultaneously executed, wherein when the oxygen supplying process is started during execution of the air supplying process, the air supply amount supplied by the air supplying process is reduced, and a time of the air supplying process is prolonged.

20. The controller for the vehicle according to claim 19, wherein the deposition amount of particulate matter in the filter is determined based on the engine rotation speed, a charging efficiency, and a coolant temperature.

* * * * *